United States Patent [19]
Tamaki et al.

[11] Patent Number: 6,132,198
[45] Date of Patent: Oct. 17, 2000

[54] CLAMPING APPARATUS FOR INJECTION MOLDING MACHINE

[75] Inventors: Masahiro Tamaki; Jun Koike, both of Shizuoka-Ken, Japan

[73] Assignee: Toshiba Kikai Kabushiki Kaisha, Tokyo-To, Japan

[21] Appl. No.: 09/140,346

[22] Filed: Aug. 26, 1998

[30] Foreign Application Priority Data

Aug. 26, 1997 [JP] Japan .................................. 9-229828

[51] Int. Cl.[7] .................................................. B29C 45/64
[52] U.S. Cl. .......................... 425/3; 100/231; 100/917; 425/589; 425/595
[58] Field of Search ...................... 425/3, 450.1, 451.9, 425/589, 595, DIG. 33; 100/231, 258 A, 917

[56] References Cited

U.S. PATENT DOCUMENTS

| | | | |
|---|---|---|---|
| 5,217,733 | 6/1993 | Dennehl et al. ........................ | 425/589 |
| 5,322,430 | 6/1994 | Kasai et al. .................................. | 425/3 |
| 5,332,385 | 7/1994 | Leonhartsberger ...................... | 425/589 |
| 5,470,592 | 11/1995 | Steger ......................................... | 425/3 |
| 5,556,656 | 9/1996 | Lampl et al. ............................ | 425/589 |
| 5,800,843 | 9/1998 | Kappelmuller et al. ................. | 425/589 |
| 5,912,020 | 6/1999 | Grunitz ....................................... | 425/3 |

FOREIGN PATENT DOCUMENTS 7-121543  12/1995  Japan .

*Primary Examiner*—James P. Mackey
*Attorney, Agent, or Firm*—Pillsbury Madison & Sutro Intellectual Property Group

[57] ABSTRACT

A tie-bar less clamping apparatus is intended for use in combination with an injection molding machine. A stationary platen (24) is fixed to a first support section (20B) of a support frame (20), and linear motors (30) are incorporated into the second support section (20C) of the support frame (20). One end of an armature (34) included in each linear motor (30) and having the shape of a rod is connected to a movable platen (28).

10 Claims, 2 Drawing Sheets

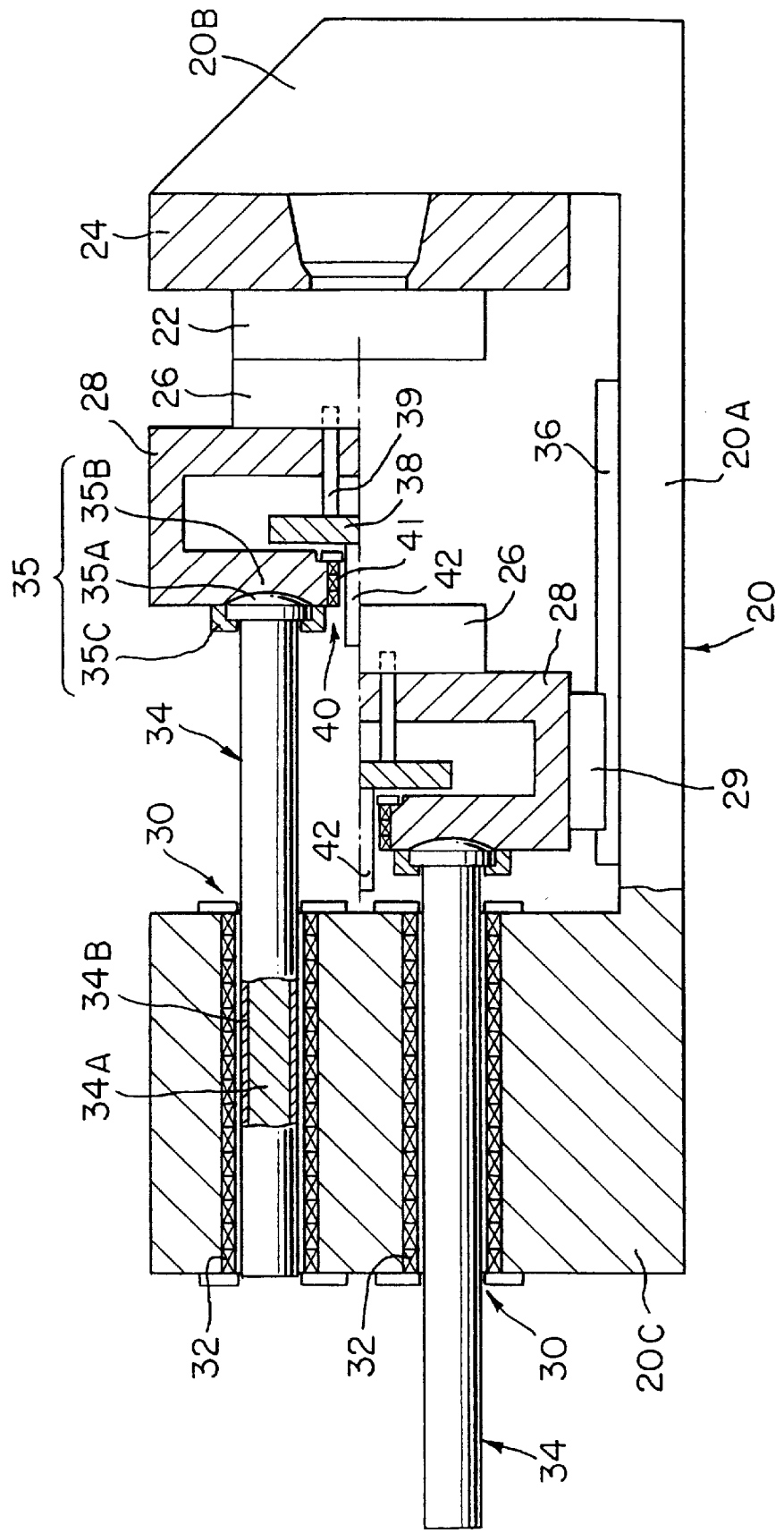
F I G. 3

CLAMPING APPARATUS FOR INJECTION MOLDING MACHINE

BACKGROUND OF THE INVENTION

1. Field of the Invention

The present invention relates to a tie-bar less clamping apparatus for an injection molding machine.

2. Description of the Related Art

In a generally known tie-bar less clamping apparatus, a stationary platen is fixedly held on one end of a frame, a movable platen is supported on the other end of the frame by a clamping mechanism for opening, closing and clamping a mold. Since the movable platen is connected to the stationary platen only by the frame without using any tie bars, clamping force is born only by the frame. The tie-bar less clamping apparatus not provided with any tie bars facilitates access to the mold and work for changing the mold. Therefore, the tie-bar less clamping apparatus is applied to small injection molding machines. On the other hand, the frame is distorted asymmetrically when the mold is clamped by the tie-bar less clamping apparatus because it is not provided with any tie bars. Consequently, the movable and the stationary mold cannot be held in a parallel positional relation, and clamping force is exerted unevenly on the mold.

Prior art clamping apparatus to solve such problems is proposed in JP B2 No. 121,543/1995. In a prior art clamping apparatus disclosed in this cited reference, a stationary platen and/or a clamping mechanism is pivotally supported on a frame so that the parallel positional relation between a stationary mold and a movable mold can be maintained even if the frame is bent. Another prior art technique proposed in this cited reference supports a movable platen so as to be tiltable on guide rails disposed on the frame by a spring suspension mechanism to maintain the parallel positional relation between the stationary mold and the movable mold. (Refer to AT-B No. 402,811/1997 which corresponds to the above Japanese patent publication.)

The foregoing prior art clamping apparatus has a complicated construction and requires difficult mold changing work.

SUMMARY OF THE INVENTION

Accordingly, it is an object of the present invention to provide a tie-bar less clamping apparatus not requiring any special mechanism for maintaining the parallel positional relation between a stationary mold and a movable mold when a mold is clamped and to provide a simple, small clamping apparatus.

Another object of the present invention is to provide a clamping apparatus capable of simply, easily and properly setting a mold closing and opening position.

With the foregoing object in view, the present invention provides a tie-bar less clamping apparatus for an injection molding machine which includes: a support frame having a base section, a first support section disposed on the base section and a second support section disposed opposite to the first support section on the base section; a stationary platen for holding a stationary mold, attached to the first support section of the support frame; linear motor having a stator and an armature, the stator being fixed to the second support section of the support frame, and the linear armature being disposed so that a predetermined gap is formed between the stator and the linear armature; and a movable platen for holding a movable mold, disposed between the first and the second support section of the support frame and capable of moving toward and away from the stationary platen according to the movement of the linear armatures of the linear motors.

The linear motor may be a cylindrical linear motor, the stator may include a primary coil, the armature may be a rod having one end connected to the movable platen and the other end inserted in the stator.

The above and other features and advantages of the present invention will become more apparent from the following description taken in connection with the accompanying drawings.

BRIEF DESCRIPTION OF THE DRAWINGS

FIG. 3 is a schematic longitudinal sectional view of a tie-bar less clamping apparatus in a second embodiment according to the present invention.

DESCRIPTION OF THE PREFERRED EMBODIMENT

Tie-bar less clamping apparatuses embodying the present invention for an injection molding machine will be described hereinafter with reference to the accompanying drawings.

Figure 1:
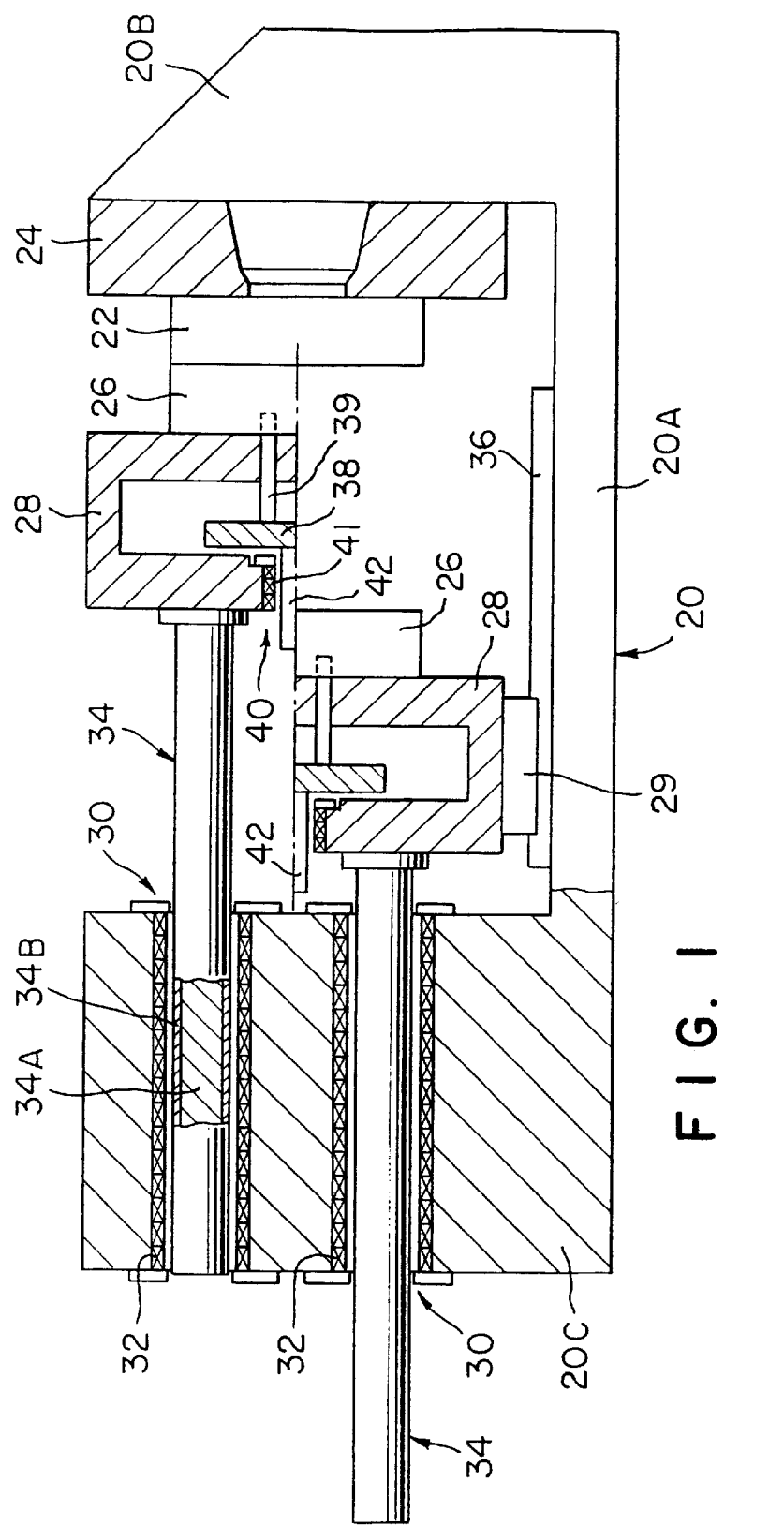
FIG. 1 is a schematic longitudinal sectional view of a tie-bar less clamping apparatus in a first embodiment according to the present invention.

Referring to FIG. 1, a tie-bar less clamping apparatus (hereinafter referred to simply as "clamping apparatus") has a C-shaped support frame 20. The support frame 20 has a base section 20A, a first support section 20B and a second support section 20C. The first support section 20B and the second support section 20C are set upright at the opposite ends of the base section 20A, respectively.

A stationary platen 24 for fixedly holding a stationary mold 22 is held fixedly on the first support section 20B. A movable platen 28 for supporting a movable mold 26 is disposed opposite to the stationary platen 24 between the first support section 20B and the second support section 20C. The movable platen 28 is associated with the stationary platen 24 only by the support frame 20 without using any tie bars.

A pair of linear motors 30 are incorporated into the second support section 20C. Each linear motor 30 is a tubular linear induction motor and has a cylindrical stator 32 and a linear armature 34 having the shape of a rod.

The stator 32 is fitted and fixedly held in a through hole formed in the second support section 20C. The stator 32 has a primary core and a primary coil. The linear armature 34 is inserted in the bore of the stator 32 so that a gap is formed between the stator 32 and the linear armature 34. The linear armature 34 has a linear core 34A of a magnetic material, such as a steel, and a jacket 34B of a material having a high conductivity, such as aluminum or copper, coating the core 34A. The linear armature 34 of each linear motor 30 is the secondary conductor of the linear motor 30.

Figure 2:
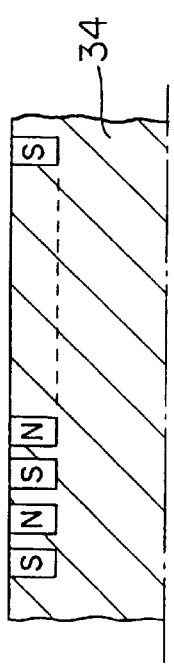
FIG. 2 is a half sectional view of a linear armature in a modification of a linear armature for a linear motor included in the tie-bar less clamping apparatus of FIG. 1.

Alternatively, the linear armature 34 of each linear motor 30 may be a rod provided with a plurality of permanent magnets axially arranged at a predetermined pitch on and embedded in the rod. When such a rod provided with a plurality of permanent magnets is employed, the linear motor 30 is a linear synchronous motor (see FIG. 2).

One end of the linear armature 34 of each linear motor 30 is fixed to the movable platen 28. The mold can be opened and closed by energizing the coils of the stators 32 of the linear motors 30 to move the movable platen 28. The driving forces of the linear motors 30 is also used for clamping the mold.

A pair of guide rails 36 are extended laterally, as viewed in FIG. 1, on the base section 20A of the support frame 20. The base section 20A of the support flame 20 supports the movable platen 28 via the guide rails 36. A guide block 29 attached to the movable platen 28 is engaged with the guide rails 36. The guide block 29 is guided for movement by the guide rails 36 to bring the movable mold 26 held on the movable platen 28 into correct engagement with the stationary mold 22. Thus the guide rails 36 and the guide block 29 form a guide mechanism for guiding the movable platen 28 for linear motions. The guide block 29 may include shoes or guide rollers engaged with the guide rails 36.

When the linear motors 30 are driven for a mold clamping operation, the support frame 20 bearing a mold clamping force exerted thereon bends. If the support frame 20 of the clamping apparatus of the present invention bends, the gap between the stator 32 and the armature 34 of each linear motor 30 changes to absorb the bend of the support frame 20. Since a change in the gap due to the bending of the support frame 20 is small, the mold clamping forces of the linear motors 30 are not affected by the change in the gap. Therefore, the appropriate positional relation between the stationary mold 22 and the movable mold 26, and the close contact of the stationary mold 22 and the movable mold 26 can be maintained. Accordingly, any complicated, large linkage employed in the prior art is not necessary.

Each armature 34 and the movable platen 28 may be connected by a spherical joint 35 as shown in FIG. 3. The spherical joint 35 has a spherical part 35A formed on the extremity of the armature 34, a spherical bearing part 35B having a spherical bearing surface and formed in the movable platen 28, and a holding part 35C formed in the movable platen 28. The working surface of the spherical part 35A has a shape complementary to that of the working surface of the spherical bearing part 35B. The holding part 35C holds the spherical part 35A of the armature 34 in engagement with the spherical bearing part 35B for movement relative to the spherical bearing part 35B. The spherical joint 35 assists a function of the linear motor 30 to absorb the bend of the support frame 20. The spherical joint 35 has a simple, small construction.

Excessive approach of the stator 32 and the armature 34 of each linear motor 30 to each other and the contact between the stator 32 and the armature 34 of each linear motor 30 must be avoided. For such a purpose, the armature 34 of the linear motor 30 may be supported in bearings mounted on the second support section 20C. When the armature 34 is supported in the bearings mounted on the second support section 20C, an appropriate clearance between the armature 34 and the bearing may be formed to allow the change in gap between the stator 32 and the armature 34.

The clamping apparatus of the present invention employing the linear motors as movable platen driving means is compact and simple. The employment of the linear motors as the movable platen driving means enables the easy, accurate control of mold moving speed and clamping force.

Referring again to FIGS. 1 and 3, the movable platen 28 is provided with a built-in ejector plate 38. A plurality of ejector pins 39 are connected to the ejector plate 38. The ejector pins 39 are extended through holes formed in the movable platen 28 and the movable mold 26 and are projected into a cavity to eject a molding.

A linear motor 40 is mounted on a central part of the movable platen 28. The construction of the linear motor 40 is substantially the same as that of the linear motors 30. The linear motor 40 has a stator 41 fixed to the movable platen 28, and an armature 42 formed in the shape of a rod and having one end connected to the ejector plate 38. The ejector plate 38, the ejector pins 39 and the linear motor 40 constitute a simple, small ejecting mechanism.

Although the invention has been described in its preferred embodiment, the present invention is not limited in its practical application to the embodiment specifically described herein and many changes and variations may be made in the design thereof without departing from the scope and spirit of the invention.

What is claimed is:

1. A tie-barless clamping apparatus for an injection molding machine, said apparatus comprising:

a support frame having a base section, a first support section disposed on the base section and a second support section disposed on the base section opposite to the first support section;

a stationary platen for holding a stationary mold, attached to the first support section of the support frame;

an electromagnetic linear motor having a stator and a linear armature, the stator being fixed to the second support section of the support frame, and the linear armature being disposed so that a predetermined gap is formed between the stator and the linear armature; and a movable platen for holding a movable mold, disposed between the first and second support section of the support frame and capable of moving toward and away from the stationary platen according to a movement of the linear armature of the electromagnetic linear motor.

2. The clamping apparatus according to claim 1, wherein the linear motor is a tubular linear motor, the stator of the linear motor includes a primary coil, the armature of the linear motor is a rod having one end connected to the movable platen and the other end inserted in the stator.

3. The clamping apparatus according to claim 2, wherein the second support section of the frame is provided with through hole coaxial with the armature of the linear motor, and the stator of the linear motor is inserted in the through hole of the second support section.

4. The clamping apparatus according to claim 2, wherein the armature of the linear motor and the movable platen are joined together by a spherical joint.

5. The clamping apparatus according to claim 2, wherein the linear motor is a linear induction motor, and the armature of each linear motor is provided with a secondary conductor included in the linear motor.

6. The clamping apparatus according to claim 2, wherein the linear motor is a linear synchronous motor, and the armature of the linear motor is provided with permanent magnets axially arranged at a predetermined pitch thereon and embedded therein.

7. The clamping apparatus according to claim 1, wherein said linear armature has a length that is sufficient for said electromagnetic linear motor to be used for both a mold moving operation for opening and closing a mold and a mold clamping operation for clamping the mold.

8. The clamping apparatus according to claim 1, further comprising a guide mechanism for guiding the movable platen for linear motions toward and away from the stationary platen.

9. The clamping apparatus according to claim 8, wherein the guide mechanism includes a guide rail attached to the base section of the frame, and a guide member provided at the movable platen and engaged with the guide rail.

10. The clamping apparatus according to claim 1, wherein the movable platen is internally provided with an ejector plate for ejecting a molding from a mold, and a linear motor for moving the ejector plate.

* * * * *